June 22, 1943.    T. T. SHORT    2,322,597
ELECTRIC CIRCUIT
Filed Oct. 9, 1941

Inventor:
Thomas T. Short,
by Harry E. Dunham
His Attorney.

Patented June 22, 1943

2,322,597

UNITED STATES PATENT OFFICE 2,322,597

ELECTRIC CIRCUIT

Thomas T. Short, Fort Wayne, Ind., assignor to General Electric Company, a corporation of New York Application October 9, 1941, Serial No. 414,261

6 Claims. (Cl. 175—365)

My invention relates to electric circuits and more particularly to improved electric circuits for converting direct current into alternating current.

Circuits for converting direct current into alternating current comprising a series tuned circuit and cooperating switching means have been heretofore known. In these circuits it is common to employ an auto-transformer or other suitable means for obtaining the desired alternating current voltage. In many applications, however, it would be desirable to obtain an alternating current voltage equal in magnitude to an available direct current voltage and with the arrangements heretofore provided this has necessitated the use of a transformer device. In accordance with my invention I provide a new and improved circuit for converting direct current into alternating current in which the alternating current voltage may be maintained at a value equal to the direct current voltage or even greater than the direct current voltage without the use of conventional transformer means.

In accordance with the illustrated embodiment of my invention I provide vibratory switching means for periodically reversing the polarity of the direct voltage impressed on a circuit comprising a series connected reactor, capacitor and load. Connected in parallel with the capacitor and load is a second capacitor. The overall characteristics of the circuit are such as to give it a natural period of oscillation equal to the desired frequency of the alternating current load circuit and substantially the frequency at which the vibratory switching means is operated. The parallel condenser draws a leading current through the reactor and by proportioning the magnitudes of the two capacitors the voltage applied to the load circuit is regulated relative to the voltage impressed on the oscillating circuit including the load. Or stated in another way, the parallel capacitor 14 is in series with the tuning reactor 12 and therefore their reactances are subtractive. This provides a low net reactance through that portion of the circuit and the resulting current flow through capacitor 14 causes an increased voltage thereacross and correspondingly increases the load voltage. The increase in voltage is therefore a function of the value of the capacity.

Figure 1:
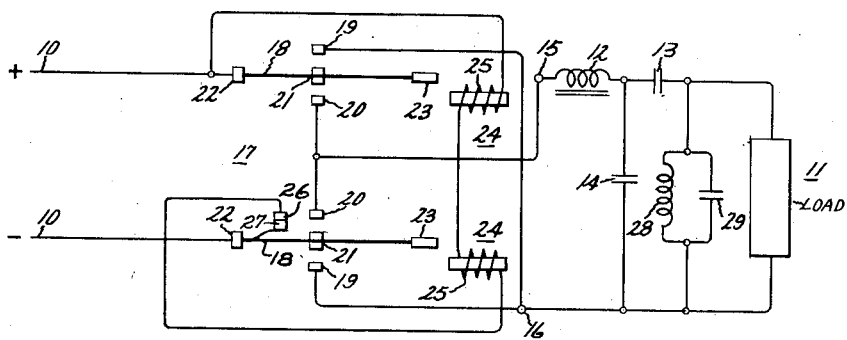
Figure 2:
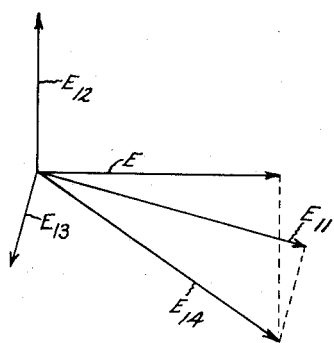

My invention, both as to its organization and operation, will be better understood by reference to the following description taken in connection with the accompanying drawing and its scope will be pointed out in the appended claims. In the drawing Figure 1 is a schematic representation of one embodiment of my invention, and Figure 2 illustrates certain operating conditions of the circuit of Figure 1.

Referring now to the drawing, I have shown my invention embodied in apparatus for transferring energy between a direct current supply circuit 10 and an alternating current load circuit illustrated schematically and designated generally by the numeral 11. A reactor 12 and condenser 13 are connected in series with the load 11. A condenser 14 is connected in parallel with series connected load 11 and condenser 13 and in series with reactor 12. The magnitudes of the inductance 12 and capacitors 13 and 14 are chosen so that the circuit between terminals 15 and 16 including the load 11 has a natural period of oscillation corresponding to the desired frequency of the alternating current voltage of the load circuit. The capacitors 13 and 14 are also chosen to produce the desired relation between the magnitude of the direct current voltage and the magnitude of the alternating current voltage of the load circuit.

The polarity of the voltage impressed on the terminals 15 and 16 from the direct current supply circuit 10 is periodically reversed by means of switching means illustrated generally by the numeral 17. The switching means may be of any suitable type and as illustrated comprises a pair of identical vibratory switches each including a vibratory reed 18 on each side of which are mounted stationary contacts 19 and 20. Suitable movable contacts 21 are mounted on the reeds between the contacts 19 and 20 which are engaged alternately as the reeds are vibrated. The reeds are fixed at one end in suitable supporting means illustrated schematically and designated by the numeral 22. The terminals 15 and 16 are connected with the contacts 19 and 20 so that the polarity of the direct current voltage impressed on the terminals 15 and 16 is reversed as the reeds are moved from one extreme position to the other. Thus, terminal 15 is connected with stationary contacts 20 and the terminal 16 is connected with the stationary contacts 19 so that when the vibratory elements are moved downwardly as viewed in Fig. 1, contact 20 is engaged by the movable contact 21 of the upper reed and the positive terminal of the direct current circuit is connected with terminal 15. Likewise the contact 21 of the lower reed is closed on contact 19 and terminal 16 is connected with the negative terminal of the direct current supply. Upon operation of the reeds to the uppermost position the connections with the direct current circuit are reversed.

In order to operate the reeds periodically from one extreme position to the other to engage contacts 19 and 20 alternately, the free ends of the reeds are provided with armatures 23 arranged to cooperate with electromagnets 24 having the windings 25 thereof connected in series and across the direct current supply circuit through a stationary contact 26 and cooperating movable contact 27 carried by the vibratory reed of one of the vibratory switches. The reeds and associated contacts are arranged so that in the intermediate position of the reeds contacts 19 and 20 are not connected with the movable contacts 21 and the contacts 26 and 27 which control the windings 25 are closed so that the coils 25 are energized to move the reeds to one extreme position. During this movement contacts 26 and 27 open and coils 25 are deenergized. As is well understood the reeds are mechanically tuned to the frequency of operation thereof and after a period of dwell the movable contacts 21 are moved toward the other extreme position by the resilience of the vibratory reeds. When the contacts 21 engage the other set of stationary contacts, the polarity of the direct current impressed on terminals 15 and 16 is reversed. As is well understood by those skilled in the art, the periodic energization of the oscillating circuit with a direct current voltage under the control of a reversing switch provides a system for converting direct current into alternating current. If the reactor 12 is provided with a nonlinear component by the inclusion of a saturable section in the core structure thereof, the circuit between terminals 15 and 16 is designed to oscillate at a natural frequency which is slightly higher, when the reactor is saturated, than the frequency at which the vibratory switches are operated so that the contacts are operated at periods of low current occurring between successive half waves of oscillating current.

In many applications it is desirable that the output voltage be substantially sinusoidal, for example, in applications where the load is an alternating current motor. To this end a filter comprising a reactor 28 and capacitor 29 are connected across the terminals of the load 11. In this way the output wave form is improved and if the load is a motor, hunting action is minimized.

By a consideration of the diagram of Fig. 2, the manner in which the circuit of the present invention functions to regulate the voltage of the load to a value equal to the impressed direct current or even greater if desired, may be more readily understood.

In Fig. 2 vectors have been employed to illustrate various voltages of the circuit although it is to be understood that some liberty has been taken in so doing since the voltages are not strictly sinusoidal. The impressed voltage, for example, is of rectangular wave form. However, for purposes of illustration the voltage impressed on terminals 15 and 16 may be represented by the vector E. The voltage across the inductive element 11 will then lead the impressed voltage by 90 degrees and may be represented by the vector $E_{11}$. The voltage across the capacitor 14 which is also the voltage across capacitor 13 and load 11 in series is equal to the impressed voltage minus the voltage across the inductance 11 and is designated $E_{14}$. The voltage across condenser 13 and load 11 may be divided into the component voltages with the component $E_{13}$ across condenser 13 lagging the current through the load circuit by 90 degrees assuming the load itself to be a pure resistance. The voltage $E_{14}$ minus the voltage $E_{13}$ is equal to the voltage across the load 11 and is represented by the vector $E_{11}$. The diagram of Fig. 2 indicates that the voltage $E_{11}$ may be greater in magnitude than the impressed voltage E and also somewhat lagging with respect to the impressed voltage.

From the foregoing it is seen that the present invention utilizes the condensive elements which are required for the tuned circuit type of inverter to regulate the voltage by drawing a leading current through the inductive element of the tuned circuit. In this way it is possible to regulate the magnitude of the output voltage without the introduction of a conventional transformer in the inverter circuit.

While I have shown and described a particular embodiment of my invention, it will be obvious to those skilled in the art that changes and modifications may be made without departing from my invention and I aim, therefore, in the appended claims to cover all such changes and modifications as fall within the true spirit and scope of my invention.

What I claim as new and desire to secure by Letters Patent of the United States is:

1. In combination, a source of voltage, a load circuit including inductance, capacitance and a load device connected in series between a pair of terminals, capacitive means connected in series with said inductance and in parallel with said capacitance and load device to regulate the voltage across said load device with respect to the voltage impressed on said terminals, and circuit controlling means operative periodically to energize said load circuit from said source with a periodic voltage, the overall characteristics of said load circuit being such as to tune said circuit substantially to the period of operation of said circuit controlling means so that the current of said load circuit is periodically reduced to zero to minimize the current interrupting duty of said circuit controlling means.

2. In combination, a load circuit including inductance, capacitance and a load device connected in series between a pair of terminals, capacitive means connected in series with said inductance and in parallel with said capacitance and load device to regulate the voltage across said load device with respect to the voltage impressed on said terminals, means for impressing a periodic voltage on said terminals, the overall characteristics of said load circuit being such as to tune said circuit substantially to the period of the periodic voltage impressed on said terminals so that the current of said load circuit is periodically reduced to zero.

3. In combination, a direct current source, a load circuit including inductance, capacitance and a load device connected in series between a pair of terminals, capacitance means connected in series with said inductance and in parallel with said capacitance and load device to regulate the voltage across said load device with respect to the voltage impressed on said terminals, mechanical switching means interconnecting said source and said load circuit, means for operating said mechanical switching means periodically to energize said load circuit with a periodic voltage, the overall characteristics of said load circuit being such as to tune said circuit substantially to the period of operation of said mechanical switching means so that the current through said mechanical switching means is periodically reduced to zero.

4. A direct current supply circuit, an alternating current load circuit, circuit controlling means interconnecting said circuits, means for operating said circuit controlling means to periodically reverse the polarity of the direct current impressed on said load circuit, said load circuit including a load, inductance and capacitance in series and a capacitance element connected in parallel with said load and said first named capacitance to conduct a portion of the current conducted by said inductive element to control the magnitude of the voltage of said load with respect to voltage of said supply circuit, the overall characteristics of said load, inductance, capacitance and capacitance element being such as to tune said load circuit to substantially the frequency of operation of said circuit controlling means.

5. A direct current supply circuit, electric translating apparatus, mechanical switching means interconnecting said direct current circuit and said translating apparatus, means for operating said switching means to periodically reverse the polarity of the direct current impressed on said translating apparatus, said translating apparatus comprising inductance, capacitance and load connected in series, and a capacitive element connected to bypass a portion of the current conducted by said inductance around said load to regulate the voltage of said load, the constants of said inductance, capacitance, capacitive element and said load being such that said translating apparatus is tuned to substantially the frequency of operation of said reversing switching means so that said switching means is operated at periods of low current.

6. In combination, electric translating apparatus comprising inductance, capacitance and a load connected in series between a pair of input terminals, a capacitive element connected to bypass a portion of the current conducted by said inductance around said load, means for periodically impressing a rectangular wave of voltage on the terminals of said translating apparatus, said translating apparatus being tuned to substantially the period of said rectangular wave and having said capacitance and said capacitive element proportioned to regulate the voltage of said output circuit to the desired value with respect to the voltage impressed on said terminals, and filter means comprising a parallel connected inductive and capacitive element shunting said load to render the voltage impressed on said load substantially sinusoidal.

THOMAS T. SHORT.